United States Patent [19]

Kullik

[11] 4,370,776

[45] Feb. 1, 1983

[54] VACUUM CLEANER FOR HOUSEHOLD AND INDUSTRIAL APPLICATION

[75] Inventor: Günter R. J. Kullik, Meinerzhagen, Fed. Rep. of Germany

[73] Assignee: Progress-Elektrogeräte Mauz & Pfeiffer GmbH & Co., Stuttgart, Fed. Rep. of Germany

[21] Appl. No.: 291,101

[22] Filed: Aug. 7, 1981

[30] Foreign Application Priority Data

Aug. 8, 1980 [DE] Fed. Rep. of Germany ....... 3030066

[51] Int. Cl.³ .............................................. A47L 9/28
[52] U.S. Cl. ......................................... 15/319; 15/412
[58] Field of Search ................................... 15/319, 412

[56] References Cited

U.S. PATENT DOCUMENTS 3,069,068 12/1962 Hansen .............................. 15/319 X
4,021,879 5/1977 Brigham ................................ 15/319

FOREIGN PATENT DOCUMENTS 1920640 11/1970 Fed. Rep. of Germany ........ 15/319

Primary Examiner—Chris K. Moore
Attorney, Agent, or Firm—Becker & Becker, Inc.

[57] ABSTRACT

A vacuum cleaner, for household and industrial purposes, including a suction fan, driven by an electric motor, for generating a working air flow, and an electrical converter, in the form of a generator driven by the working air flow, for detecting the strength of the working air flow, the output of the generator being connected with a regulating and control circuit.

16 Claims, 1 Drawing Figure

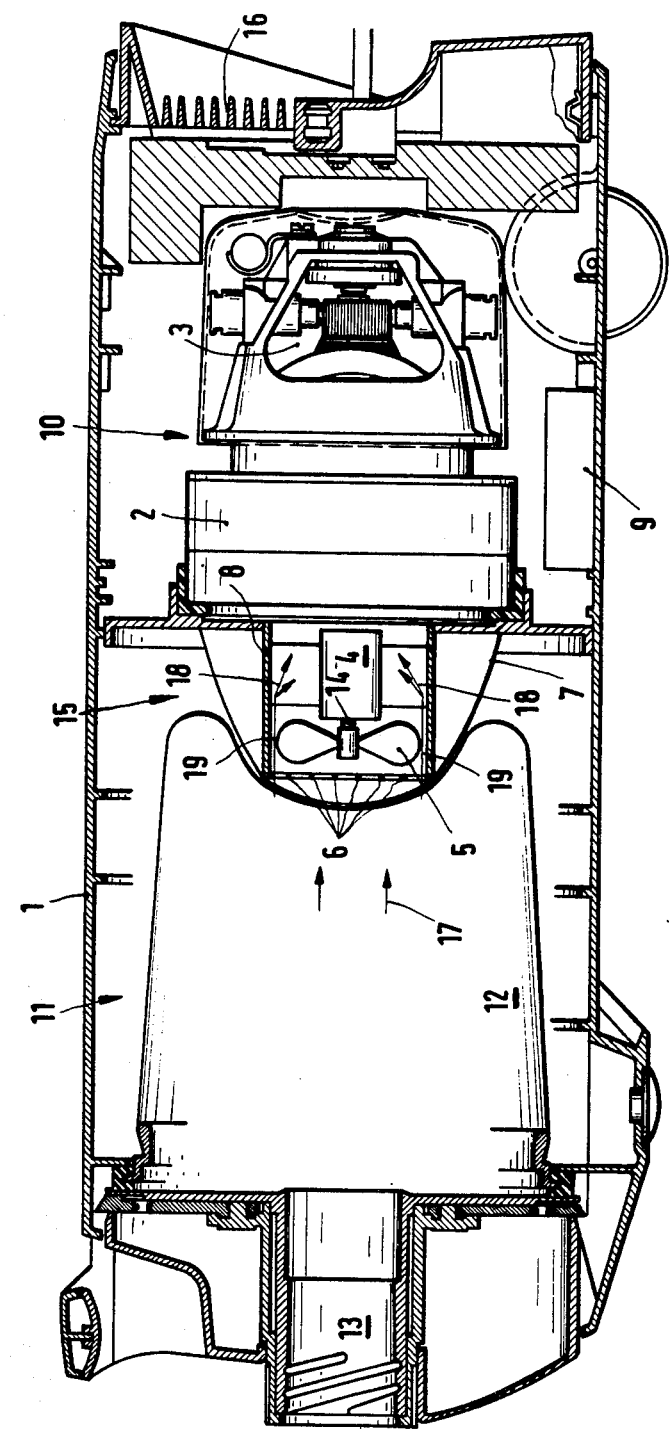

VACUUM CLEANER FOR HOUSEHOLD AND INDUSTRIAL APPLICATION

The present invention relates to a vacuum cleaner for household and industrial application, and includes a suction fan, driven by an electric motor, for generating a working air flow, and an electrical converter which detects the strength of the working air flow, the output of this converter being connected with a regulating and control circuit.

With known vacuum cleaners, the working air flow is generated by a suction fan coupled with an electric motor. The working air flow passes or flows through a cleaning tool and appropriate connecting devices to the suction fan, with the cleaning tool being moved over the surfaces which are to be cleaned. In the area of surface contact of the cleaning tool, the suction air flow enters the tool at high speed; in the region of the cleaning tool, the dirt particles are taken along and are conveyed to a dust-collecting container through the flow route. The working air flows through the dust-collecting container, is filtered, and discharges freely into the surrounding atmosphere.

A change of the strength of the working air flow is advantageous dependent upon the articles to be cleaned. Thus, for instance during cleaning of decorative materials, curtains, draperies, and the like, a far smaller suction air or vacuum flow is sufficient than for cleaning, for example, a textile floor covering. Different devices are known for changing the suction air flow. A by-pass suction path can be created by means of shift or rotary devices in the region of the suction path, so that the intensity of the working air flow is reduced in the region of the cleaning tool. Other devices make possible a change in the intensity of the working air flow by changing the fan speed. These adjustment steps must, however, be carried out manually and require continuous readjustment, especially with changing cleaning requirements or conditions; in addition, such readjustment depends upon the skill or attention of the operator of the device.

Other known devices already provide for a readjustment of the intensity of an adjusted working air flow. Thus, for example, an externally heated temperature-dependent resistor is arranged in the working air flow, so that it is more or less strongly cooled off as a function of the strength of the air flow. The temperature-dependent resistor change is utilized for control and regulation of the electric motor, which is connected with the suction fan. This type of measured value detection, however, operates too slowly to work satisfactorily with rapidly changing cleaning conditions.

Other known devices determine the pressure difference of the working air flow relative to the surrounding atmosphere, for example along a tube or according to the principle of a Pitot tube, with the pressure difference being transformed by suitable converters (resistance- or expansion-measuring strips or wires, resistance foils, and the like) into electrical values for electrical control of the suction fan speed.

It is also known to detect or determine the working air flow by mechanical/electrical converters. The working air flow can flow against a spring-loaded flap, the movements or positions of which are detected by an electrical converter, for example by a potentiometer or by a light stop.

Although the foregoing devices detect the pressure in the working air flow, they do so with a considerable delay in time and relatively inaccurately, and are very susceptible to disturbance on the basis of their construction.

It is therefore an object of the present invention to control or regulate the working air flow of a vacuum cleaner with a simple and disturbance-proof device, which is to operate accurately and quickly, in such a way that the preselected strength of a working air flow is extensively maintained independently of the existing working conditions.

This object, and other objects and advantages of the present invention, will appear more clearly from the following specification in connection with the accompanying drawing, which is a cross sectional view of one embodiment of a vacuum cleaner having features in accordance with the present invention.

The vacuum cleaner of the present invention is characterized primarily in that the electrical converter is in the form of a generator which is driven by the working air flow.

The generator can be a signal generator, particularly as a pulse emitter (digital output signals), or a voltage generator with an analog output signal. Since the generator is driven by the working air flow, every change of intensity of the air flow, i.e. a reduced air flow, directly effects a changed output signal of the generator. Since the output signal of the generator can be very high in conformity to the construction of the latter, the output signal can be utilized directly for controlling a regulating device. In contrast to the state of the art therefore, it is not necessary to have any amplifier stages, which amplify a very weak signal to a magnitude necessary for control or regulation, but which delay the signal output.

Depending upon the nature of the article to be cleaned, the working air flow passing through the device may be near maximum, i.e. little resistance to flow, for example when vacuuming curtains or drapes, or the suctioned air flow may be substantially completely throttled, i.e. great resistance to throughflow of air, as for example during cleaning of low-nap textile floor coverings. The different air flows bring about different speeds of the generator, which delivers an output signal proportional to the speed. These different output signals are used in a regulating and control system for desired regulation and control of the blower or fan motor, and possibly attached indicators. The strength of the working air flow can thus be extensively uniformly maintained within predetermined limits. Accordingly, for instance, the working air flow is throttled during vacuuming of curtains.

According to specific features of the present invention, the generator may be connected with an air turbine arranged in the working air flow. The air turbine, which is independently journalled, may be connected with the generator by means of a coupling element, whereby the air turbine preferably forms a single structural unit with the generator. The air turbine may also be arranged on the generator shaft. The air turbine may be provided with one or more air-guiding devices for deflecting and guiding the air flow which drives the turbine.

The air turbine and/or the generator may be arranged in a tubular structural element or mantle. The air turbine and the generator may be arranged in a tubular structural element which has guide elements for guiding and/or deflecting the working air flow passing therethrough.

The air turbine and the generator may be arranged or mounted on the suction side of the suction fan. The electric motor, the suction fan, the generator, and the air turbine, may all be coaxially arranged.

The housing of the air turbine and/or the housing of the generator may be integrally connected with the housing of the motor-blower unit, which comprises the suction fan and the electric motor; a flow route of suitable length is preferably provided between the air turbine, the generator, and the motor-blower unit.

The entire working air flow may pass through the air turbine. Alternatively, a partial air flow of the working air flow may pass through the air turbine through a branch or by-pass line. The quantity of air flow conveyed to the air turbine may be variable. The tubular structural element may be surrounded by a dome-like mantle having an opening located across from the opening of the structural element.

Referring now to the drawing in detail, in the housing 1 there is arranged a suction fan 2 which is driven by an electric motor 3. This motor-blower unit 10 generates a suction air or vacuum flow which is utilized as a working air flow and flows into the device in a known manner from a non-illustrated cleaning tool through a likewise non-illustrated suction tube and a suction hose and through an inlet opening 13. The working air flowspasses or flows through a dust filter 12, which is embodied as a dust-collecting container 11, and again leaves the device through the discharge openings 16 after flowing through the motor-blower unit 10. An air turbine 5 is arranged between the vacuum cleaner container 11 and the motor-blower unit 10, and is seated on the shaft 14 of a generator 4. The air turbine 5 rotates at variable speeds which change in proportion to the magnitude of the changing working air flow, so that the generator 4, which is coupled to the air turbine 5, likewise rotates at different speeds. The generator 4 delivers an electrical output signal in proportion to its speed. These output signals are conveyed by non-illustrated electrical lines to a regulating and control circuit 9. This regulating and control circuit 9 regulates the speed of the electric motor 3 in such a way that the strength of the working air flow is extensively maintained at a value which has been adjusted or preselected. If, for example, the through flow resistance of the working air flow is reduced (when vacuuming drapes or curtains), then the speed is reduced by the regulating and control circuit 9 of the suction fan 2; if the working resistance is increased (when vacuuming low-nap textile material or floor covering), then the speed is increased. If indicator elements are provided they are connected to this regulating and control system and indicate to the operator of the vacuum cleaner the particular operating condition of the device.

The air turbine 5 and the generator 4 are advantageously approximately coaxially surrounded by a common, tubular structural element 8, the intake opening of which is provided with air baffles or deflectors 6. These air deflectors serve to guide or deflect the inflowing air, and are advantageously arranged in such a manner that parts 18 of the working air flow 17, 18 can be guided through the flow channels 19 around the air turbine 5. In this way, the air flow 17 passing through the air turbine can be delimited or defined, so that one and the same structural unit, comprising air turbine and generator, can be used with suction fans of different capacity. The partial quantity of the working air flow passing through the air turbine 5 is selected in such a way that at any given time, the most advantageous range of capacity or efficiency of the generator 4 is utilized.

The generator 4 and the air turbine 5 are advantageously designed as a unit 15 which is installed in the tubular structural element 8. This structural unit 15 is so embodied that it can be added at any time to already existing vacuum cleaners, or can also be installed within the housing of devices which are to be newly assembled.

The structural unit 15 is advantageously located in the suction region of the suction fan 2, so that a damaging heating thereof by the working air flow passing therethrough is avoided. The suction fan 2, the electric motor 3, the generator 4, and the air turbine 5 are advantageously coaxial, being located approximately on the central longitudinal axis of the housing 1. To facilitate the assembly of the inventive vacuum cleaner, the housing of the structural unit 15 can be made integral with the housing of the motor-blower unit 10.

To avoid damage to the dust-collecting container 11 or to the filter 12 from sharp edges in the opening region of the tubular shroud or structural element 8, an arched dome 7 is advantageously installed over the tubular structural element 8, and can comprise a full mantle or a dome-like frame. This full mantle or frame 7 has an opening, for the entry of the working air flow, corresponding identically with the opening of the tubular structural element 8.

The present invention is, of course, in no way restricted to the specific disclosure of the specification and drawing, but also encompasses any modifications within the scope of the appended claims.

What I claim is:

1. A vacuum cleaner for home and industry, comprising:
    a housing having an inlet for drawing in dirt-laden air with a working air flow, and an outlet for discharging environmentally acceptable air;
    an electric motor mounted in said housing;
    a suction fan mounted in said housing and driven by said electric motor for generating said working air flow in the form of a vacuum flow;
    an electrical converter in the form of a generator mounted in said housing and driven by said working air flow, said generator detecting the strength of said working air flow; and
    a regulating and control circuit associated with said housing for regulating the speed of said electric motor, the output of said generator being connected with said regulating and control circuit.

2. A vacuum cleaner according to claim 1, which includes an air turbine mounted in said housing, said air turbine being operatively connected with said generator and being arranged in said working air flow.

3. A vacuum cleaner according to claim 2, in which said air turbine is independently journalled, and which includes a coupling element interposed between and interconnecting said air turbine and said generator.

4. A vacuum cleaner according to claim 3, in which said air turbine and said generator form a single structural unit.

5. A vacuum cleaner according to claim 2, in which said generator includes a generator shaft, said air turbine being mounted on said shaft.

6. A vacuum cleaner according to claim 5, in which said air turbine is provided with at least one air guiding means for deflecting and guiding said working air flow which drives said air turbine.

7. A vacuum cleaner according to claim 2, which includes a tubular structural element mounted in said housing, at least one of said air turbine and said generator being arranged in said tubular element.

8. A vacuum cleaner according to claim 7, in which both said air turbine and said generator are arranged in said tubular structural element, and in which said tubular element is provided with guide elements for selectively guiding and deflecting said working air flow which passes therethrough.

9. A vacuum cleaner according to claim 8, in which said air turbine and said generator are arranged on the suction side of said suction fan.

10. A vacuum cleaner according to claim 9, in which said electric motor, said suction fan, said generator, and said air turbine are all coaxially arranged.

11. A vacuum cleaner according to claim 7, in which said tubular structural element includes an opening for receiving said working air flow therein, and which includes a dome-like mantle which surrounds said tubular element and has an opening located in the vicinity of said opening of said tubular element.

12. A vacuum cleaner according to claim 2, in which said suction fan and said electric motor form a motor-blower unit which is provided with its own housing, and in which said air turbine and said generator are respectively provided with a housing, said housing of at least one of said air turbine and said generator being integrally connected with said housing of said motor-blower unit.

13. A vacuum cleaner according to claim 12, which includes a flow route, for said working air flow, between said air turbine, said generator, and said motor-blower unit.

14. A vacuum cleaner according to claim 2, in which the entire working air flow passes through said air turbine.

15. A vacuum cleaner according to claim 2, which includes a branch line of working air flow, only part of said working air flow passing through said air turbine.

16. A vacuum cleaner according to claim 2, in which the proportion of said working air flow conveyed to said air turbine is variable.

* * * * *